(12) United States Patent
Evans et al.

(10) Patent No.: US 6,210,154 B1
(45) Date of Patent: Apr. 3, 2001

(54) TREATMENT OF EXHAUST GASES FROM KILNS

(75) Inventors: Lawrence Paul Evans; Thomas McQuiggan Lowes, both of Bearsted (GB)

(73) Assignee: Blue Circle Industries, Inc.

( * ) Notice: Subject to any disclaimer, the term of this patent is extended or adjusted under 35 U.S.C. 154(b) by 0 days.

(21) Appl. No.: 09/425,100

(22) Filed: Oct. 22, 1999

Related U.S. Application Data

(63) Continuation-in-part of application No. 08/837,690, filed on Apr. 22, 1997, now Pat. No. 5,989,017.

(51) Int. Cl.[7] .................................................. F27B 15/08
(52) U.S. Cl. ........................ 432/106; 432/14; 110/246; 110/346
(58) Field of Search ................................ 432/14, 15, 58, 432/106; 110/246, 346

(56) References Cited

U.S. PATENT DOCUMENTS

| | | | |
|---|---|---|---|
| 4,295,823 | 10/1981 | Ogawa et al. | 432/106 |
| 4,551,051 | 11/1985 | Hofbauer et al. | 414/21 |
| 4,627,877 | 12/1986 | Ogawa et al. | 106/100 |
| 4,808,108 | 2/1989 | Tiggesbäumker et al. | |
| 5,078,594 | 1/1992 | Tutt et al. | 432/103 |
| 5,098,285 * | 3/1992 | Bauer | 432/14 |
| 5,667,582 * | 9/1997 | Ziegler et al. | 106/761 |
| 5,806,442 | 9/1998 | Aldred et al. | 110/246 |
| 5,816,795 | 10/1998 | Hansen et al. | 432/21 |
| 5,989,017 | 11/1999 | Evans | 432/14 |

FOREIGN PATENT DOCUMENTS

| | | |
|---|---|---|
| 2343954 | 3/1975 | (DE) . |
| 3426296 | 1/1986 | (DE) . |
| 3326375 | 7/1993 | (DE) . |
| 109379 | 5/1984 | (EP) . |
| 0391463 | 10/1990 | (EP) . |
| 568202 | 11/1992 | (EP) . |
| 764614 | 3/1997 | (EP) . |
| 2015706 | 9/1979 | (GB) . |
| 2034014 | 5/1980 | (GB) . |
| 61-068129 | 4/1986 | (JP) . |
| WO 97/30003 | 8/1997 | (WO) . |

* cited by examiner

Primary Examiner—Gregory Wilson
(74) Attorney, Agent, or Firm—Welsh & Katz, Ltd.

(57) ABSTRACT

Emission of nitrogen oxides from a mineral-burning process, for example a cement-manufacturing process, is reduced by passing the exhaust gas from the rotary kiln in which the mineral raw materials are burnt to a combustion zone in which solid fuel elements, for example waste tyres, are maintained for a sufficient period and at a sufficient temperature for at least 30% by weight of the volatile combustible content of the solid fuel elements to be combusted, the combustion zone comprising at least one region in which the combustion of the solid fuel elements occurs under sub-stoichiometric conditions. The solid fuel elements may be introduced into the hot gas stream at at least one point between the mineral-inlet end of the rotary kiln and the lowermost cyclone of an associated preheater system, e.g. into the gas stream within a precalciner vessel or riser duct. Preferably, tertiary air from a clinker cooling apparatus is supplied downstream of the combustion zone (relative to the flow of kiln exhaust gas). As an alternative, the solid fuel elements may be introduced into a Lepol grate preheater.

50 Claims, 5 Drawing Sheets

TREATMENT OF EXHAUST GASES FROM KILNS

REFERENCE TO RELATED APPLICATION

The present application is a continuation-in-part of U.S. patent application Ser. No. 08/837,690 filed Apr. 22, 1997, now U.S. Pat. No. 5,989,017, the teaching in which is incorporated herein by reference.

FIELD OF THE INVENTION

The present invention relates to a method of reducing the emission of nitrogen oxides from a mineral-burning process, especially although not exclusively a cement-manufacturing process, in which the mineral raw material is passed through a preheater region before it is passed into a rotary kiln. The present invention also relates to apparatus in which such a method may be carried out, and further relates to the mineral products of such mineral-burning processes.

BACKGROUND OF THE INVENTION

Kilns in which mineral matter is subjected to burning are commonly fired by means of a so-called fossil fuel, such as pulverised coal, natural gas or fuel oil, or a fuel derived therefrom, such as coal gas. However, the combustion of such a fuel in the presence of a combustion-supporting gas, usually air, may give rise to the generation of nitrogen oxides ($NO_x$), the emission of which into the atmosphere is undesirable for environmental reasons. Such nitrogen oxides are generated from nitrogen compounds that are present in the fuel; also, if the combustion temperature is sufficiently high, in particular above 1200° C., nitrogen oxides would also be generated by the reaction of nitrogen and oxygen that are present in the combustion-supporting air. The patent literature contains a number of proposals for ways in which the emission of $NO_x$ from mineral-burning processes may be reduced, for example as disclosed in the following documents.

DE-A-3 426 296 discloses a process for reducing the content of $NO_x$ in the exhaust gas of a rotary kiln in the manufacture of cement, in which air that has been heated during the cooling of the cement clinker is passed, a combustion air, through the kiln, a calciner and a cyclone preheater in counter-current to the cement raw material. The firing in the calciner is reducing in a first zone but, on account of supply of heated combustion air, is oxidising in a subsequent zone. Part of the gas leaving the kiln is passed through the reducing zone in the calciner, in which nitrogen oxide is reduced to nitrogen and fresh formation of nitrogen oxide is very largely obviated. Thereafter, this part of the gas is mixed with the other part of the gas leaving the kiln and the mixture is passed through the oxidising zone of the calciner. The said other part of the gas, on account of its content of oxygen, will enable the carbon monoxide, which is formed in the reducing zone, to be completely burnt. A similar method is disclosed for processes in which the air is passed through the kiln and then through a grid preheater.

U.S. Pat. No. 4,808,108 discloses a method of heat-treating fine-grained material, in which the material is preheated in a preheating zone using the hot exhaust gases from a precalcination zone, the preheated material is then further heated in the precalcination zone by the combustion of additional fuel, and the material subsequently undergoes burning in a combustion zone, in particular a rotary kiln, and the exhaust gases from the combustion zone are passed into the precalcination zone. The fuel that is combusted in the precalcination zone is delivered at two locations that are spaced one from the other. The burnt material that issues from the combustion zone may be cooled in a cooler by means of air and the air which is exhausted from the cooler may then be passed into the precalcination zone at two spaced locations, each adjacent a respective location at which the fuel enters the precalcination zone. The portion of the fuel that is added to the precalcination zone at the point nearer to the rotary kiln and the content of oxygen in the gases in this region are controlled so as to achieve a sub-stoichiometric combustion resulting in the establishment of a carbon monoxide content between 0.05 and 1 per cent. Under these reducing conditions, the nitrogen oxides contained in the exhaust gases from the rotary kiln, which are passed into the precalcination zone, are largely decomposed to nitrogen, with the formation of carbon dioxide. The material introduced into the precalcination zone from the preheating zone has a catalytic effect on the removal of the nitrogen oxides and also serves to regulate the temperature since the deacidification thereof takes up the heat produced by the combustion. In the other region where fuel is introduced into the precalcination zone, the combustion of the fuel also gives rise to the combustion of the carbon monoxide emerging from the region of the precalcination zone adjacent the kiln.

EP-A-0 391 463 discloses a method for the reduction of $NO_x$ emission from apparatus for burning mineral raw materials, especially cement raw materials, by means of a nitrogen-containing solid fuel such as coal. The apparatus comprises a burning zone, in particular a rotary kiln, a precalcining zone for calcining the raw materials prior to their entry into the burning zone, and a multi-string, multi-stage preheater system for preheating the raw materials by heat exchange with the exhaust gases from the burning zone and/or from the precalcining zone. One preheater string, the kiln string, is in direct connection with a kiln riser pipe and another preheater string, the calciner string, is connected to the precalcining zone. Material from the burning zone is cooled in a cooling zone, at least some of the exhaust air from which is passed to the precalcining zone as combustion air. Preheated raw material from the kiln string and the calciner string is subjected to precalcination in the precalcining zone and thereafter the bulk of the precalcined raw materials is fed to the burning zone. A nitrogen-containing solid fuel such as coal is fed into the kiln riser pipe in an amount as to constitute from 20 to 50 per cent of the total amount of solid fuel supplied to the apparatus. The nitrogen introduced into the kiln riser pipe by means of the fuel reacts with the nitrogen oxide ($NO_x$ generated in the burning zone and present in the exhaust gas therefrom, thereby forming harmless nitrogen ($N_2$). The non-combusted fuel, which now contains less nitrogen, is separated from the gases in the lowermost preheater stage of the kiln string and is conveyed to and combusted in the calcining zone.

WO-A-97/30003 discloses a method for reducing the $NO_x$ emission from a kiln plant for the heat treatment of raw materials, in which plant nitrogen-containing fuel can be fired in at least three different zones. In a first such zone, in particular a kiln, an amount c of fuel is burned and to this zone there is fed an oxygen-containing gas. In a second such zone, especially a calciner, an amount b of fuel is burned and to this zone there is fed NO-containing exhaust gas from the other two zones, the exhaust gases from the said second zone being removed from the kiln plant. In the third such zone, in particular a burning compartment, an amount a of fuel is burned and to this zone there is fed at least a portion of the raw materials and also an oxygen-containing gas. The oxygen-containing gas fed to the said second and third zones may be exhaust air from a cooler in which the burned material from the kiln is cooled. The amount of fuel b+a is determined by the requirements of the raw-material treatment; also, the amounts of fuel b and a are adjusted until a minimum NO content is achieved in the exhaust gases from the said second zone. The temperatures in the second and third zones should be as high as the process permits but below 1200° C. In certain embodiments the temperature in the second zone is from 900 to 1150° C. and the temperature in the third zone is from 1000 to 1200° C.

There have also been proposals for the disposal of waste materials, for example used tyres, in kilns and/or associated plant for the heat treatment of mineral matter, in particular kilns and/or associated plant for the production of cement.

Every year large numbers of pneumatic tyres, in particular automobile tyres, are discarded. For example, it was reported in Rock Products, October 1980, that over 200 million automobile tyres were being discarded every year in the United States, and that some 300,000 tons of old tyres were being generated annually in what was then West Germany. A large proportion of waste tyres are simply buried in land-fill sites and there have been various proposals for using comminuted waste tyres, e.g. in road-building asphalts; nonetheless, the environmentally acceptable disposal of waste tyres still presents a considerable challenge.

It has been recognised that the calorific value of waste tyres, at 27,000 kJ/kg, is comparable to that of coal and it is known to use chipped or otherwise comminuted tyres as an auxiliary fuel in cement kilns. However, when account is taken of the capital investment needed for machines for chipping the tyres and the energy costs in operating such machines, the cost benefits obtained by replacing coal or other fossil fuel with tyre chips are often not substantial. Furthermore, if the tyre chips are to be fed into a precalciner or preheater system, it is necessary carefully to control the velocity of the gas in that system to ensure adequate combustion of the chips before they are swept into the next stage of the preheater.

There have been proposals for feeding whole tyres directly into a rotary cement kiln. For example, U.S. Pat. No. 4,551,051 discloses apparatus by means of which whole tyres may be delivered through the mineral-inlet end of a rotary cement kiln to a selected region of the kiln. In U.S. Pat. No. 5,078,594 an apparatus is described for charging whole tyres through a port in the wall of a rotating cement kiln into a heated-zone of the kiln.

However, the delivery of whole tyres directly into a rotary cement kiln requires careful control to ensure that the tyres are fully burnt within the kiln, that there is no localised reduction, which can lead to the build-up of solids and blockages in the lower stages of the preheater system, and that the solid residue is uniformly incorporated into the cement clinker.

DE-A-3,326,375 discloses a method for the production of cement clinker in a rotary kiln, in which the raw material is preheated in a multi-stage cyclone preheater and is then calcined using different fuel components in at least two different places in the preheater before entry into the rotary kiln. This method is characterised in that the raw material is preheated and calcined in two separate streams in separate strings of the preheater, in that a coarse particulate solid fuel component (for example used tyres or lump coal) is supplied to the first preheater string at a point located close to the rotary kiln such that this fuel component arrives in the rotary kiln before complete combustion; and in that a liquid, gaseous of fine particulate solid fuel component is introduced into the second string of the preheater such that this fuel component is thoroughly mixed with the material to be calcined before complete combustion. It is suggested in this German patent application that this method permits the use of quite different types of fuel without the formation of coatings or other operational problems in the preheater; it is suggested that this is due to the fact that the coarse particulate fuel component is practically completely gasified in the rotary kiln (page 5, lines 1–6, and page 5, line 25 to page 6, line 1). In the detailed description of an illustrated embodiment, the point at which the coarse particulate solid fuel component is supplied to the first preheater string is selected such that the coarse particulate fuel will fall more or less freely through the inlet housing associated with the rotary kiln and thence into the rotary kiln itself, where it is gasified (page 11, lines 1–9). There is no disclosure or suggestion that the coarse particulate fuel is maintained in contact with the hot gas stream in the preheater.

U.S. Pat. No. 4,295,823 and U.S. Pat. No. 4,627,877 describe, and respectively claim, an apparatus and a method for continuously producing a cement clinker in which a combustible waste material is employed as a heat source. According to the disclosure in these U.S. patents, a cement raw material is fed into a preheating or calcining chamber, from which the resultant preheated or calcined material is forwarded into a heating region within a rotary kiln in order to convert the material into a cement clinker. The cement clinker is then moved into a cooling chamber in which its temperature is decreased by means of cooling air. Exhaust gas from the heating region in the rotary kiln is passed into the preheating or calcining chamber. The combustible waste material is fed into a heat-decomposition chamber into which exhaust gas from the heating region of the rotary kiln is also introduced and in which the combustible waste material is thermally decomposed in order to generate a combustible gas. This combustible gas is then conveyed to, and burnt within, the preheating or calcining chamber to preheat or calcine the cement material. Accordingly, the said waste material undergoes a pyrolysis and gasification process rather than combustion as such. Any solid residue from the thermal decomposition of the combustible waste material is allowed to pass into the heating region within the rotary kiln. Various combustible waste materials are mentioned, including tyre wastes, rubber wastes, oil wastes, oil-containing sludges, asphalt wastes, pitch wastes, and organic compound wastes.

U.S. Pat. No. 5,816,795 discloses a preheater or precalciner cement kiln including a rotary vessel, a riser duct for counterflow preheating of cement raw materials, and a shelf-transition portion between the riser duct and the rotary vessel for receiving preheated mineral material from the riser duct and delivering it into the rotary vessel. The riser duct is modified in order to permit the burning in the kiln gas stream of solid fuel, in particular combustible waste material. A solid fuel delivery port is formed in the riser duct at a point downstream of the self-transition portion (relative to the kiln gas flow). A fuel delivery tube extends through the fuel delivery port and includes a fuel inlet end that is outside the riser duct and a fuel outlet end that is inside the riser duct. A grate is positioned in order to receive and suspend solid fuel emerging from the output end of the fuel delivery tube in the riser duct. A feed mechanism, for example a reciprocating ram, is used to feed the fuel through the delivery tube and onto the grate. The fuel delivery tube may comprise an intermediate staging portion between the inlet and outlet ends, which staging portion and the outlet end are preferably insulated. In certain embodiments insulation is provided by an annular passageway for the delivery of oxygen-containing gas such that the gas contacts the solid fuel suspended on the grate in the kiln gas stream. A combustion control agent, for example cement raw material or cement kiln dust, may be metered into the intermediate staging portion so as to contact the fuel therein which is awaiting delivery onto the grate.

There remains a need for an improved method whereby the content of $NO_x$ in the effluent gas issuing from a mineral-burning kiln can be substantially reduced. There also remains a need for an improved method whereby whole tyres can be disposed of in a mineral-burning, e.g. cement-manufacturing, process.

SUMMARY OF THE INVENTION

Disclosed herein is a method for disposing a tyres in a mineral-burning process, preferably a cement-manufacturing process, carried out in a kiln system in which a rotary kiln is associated with a preheater section, wherein the tyres are introduced into a hot gas stream within the preheater section, the tyres being maintained (e.g. supported or suspended) in contact with the hot gas for a sufficient period to effect at least partial combustion of the tyres. In certain embodiments, the preheater section comprises at least one cyclone and at least one heat-exchange duct, and the tyres are introduced into the hot gas stream at at least one point between the mineral-inlet end of the rotary kiln and the lowermost cyclone. In certain of these embodiments a precalciner vessel will be located between the material inlet of the kiln and the lowermost cyclone.

Also disclosed herein is an apparatus for disposing of tyres in a mineral-processing kiln system, preferably a cement kiln system, in which a rotary kiln is associated with a preheater section, which apparatus comprises means for supporting at least one tyre within the preheater section and means for feeding tyres to the supporting means. In certain embodiments wherein the preheater section comprises at least one cyclone and at least one heat-exchange duct, the apparatus comprises gas-conveying means, preferably including a precalciner and/or a riser duct, which gas-conveying means is adapted to convey hot gas from the mineral-inlet end of the rotary kiln to the lowermost cyclone, the said gas-conveying means being provided with at least one inlet through which tyres may be fed; means for selectively opening and closing the inlet; means for supporting at least one tyre within the said gas-conveying means, preferably within the said precalciner or riser duct, such that the tyre so supported will be in contact with hot gas (which term includes a mixture of gases) within the said gas-conveying means, preferably within the said precalciner or riser duct, during operation; and means for feeding tyres through the inlet, when open, and to the said supporting means. In certain other embodiments, the preheater section comprises a Lepol grate preheater into which the tyres are introduced and suspended in the gas stream which enters the grate preheater for the kiln.

The present invention, in one aspect thereof, also provides a method of reducing the emission of nitrogen oxides from a mineral-burning process, which process comprises the steps of feeding mineral raw material into a rotary kiln where it is burnt, the rotary kiln being fired by the combustion therein of a first fuel in the presence of a first combustion-supporting gas, the method being characterised by the steps of passing the exhaust gas from the rotary kiln through a first zone and of introducing a second fuel, in the form of solid fuel elements, into the said first zone, the solid fuel elements being maintained within the said zone until at least 30% by weight of the volatile combustible content thereof has been removed from said fuel elements, the said first zone containing at least one region having sub-stoichiometric conditions. Combustion of at least part of the volatile combustible content (which may comprise one or more components) of the second fuel may occur under sub-stoichiometric conditions in said region. Preferably, combustion-supporting supporting gas is introduced in a second zone downstream relative to the flow of kiln exhaust gas) of said first zone.

The present invention, in another aspect thereof, also provides an apparatus for the carrying out of a mineral-burning process, which apparatus comprises a rotary kiln in which mineral raw material may be burnt, said kiln having a mineral-inlet end and a mineral-outlet end; a preheater section which comprises at least one cyclone; gas-conveying means for conveying exhaust gas from the mineral-inlet end of the kiln to the lowermost preheater cyclone; a support for supporting at least one solid fuel element within the gas-conveying means such that the said fuel element so supported will be in contact with the hot exhaust gas within the gas-conveying means during operation; a feeder arranged such that it can feed solid fuel elements to the said support; and a gas inlet for introducing a combustion-supporting gas into the gas-conveying means at a point downstream (relative to the flow of the kiln exhaust gas) of the said support.

Figure 1:
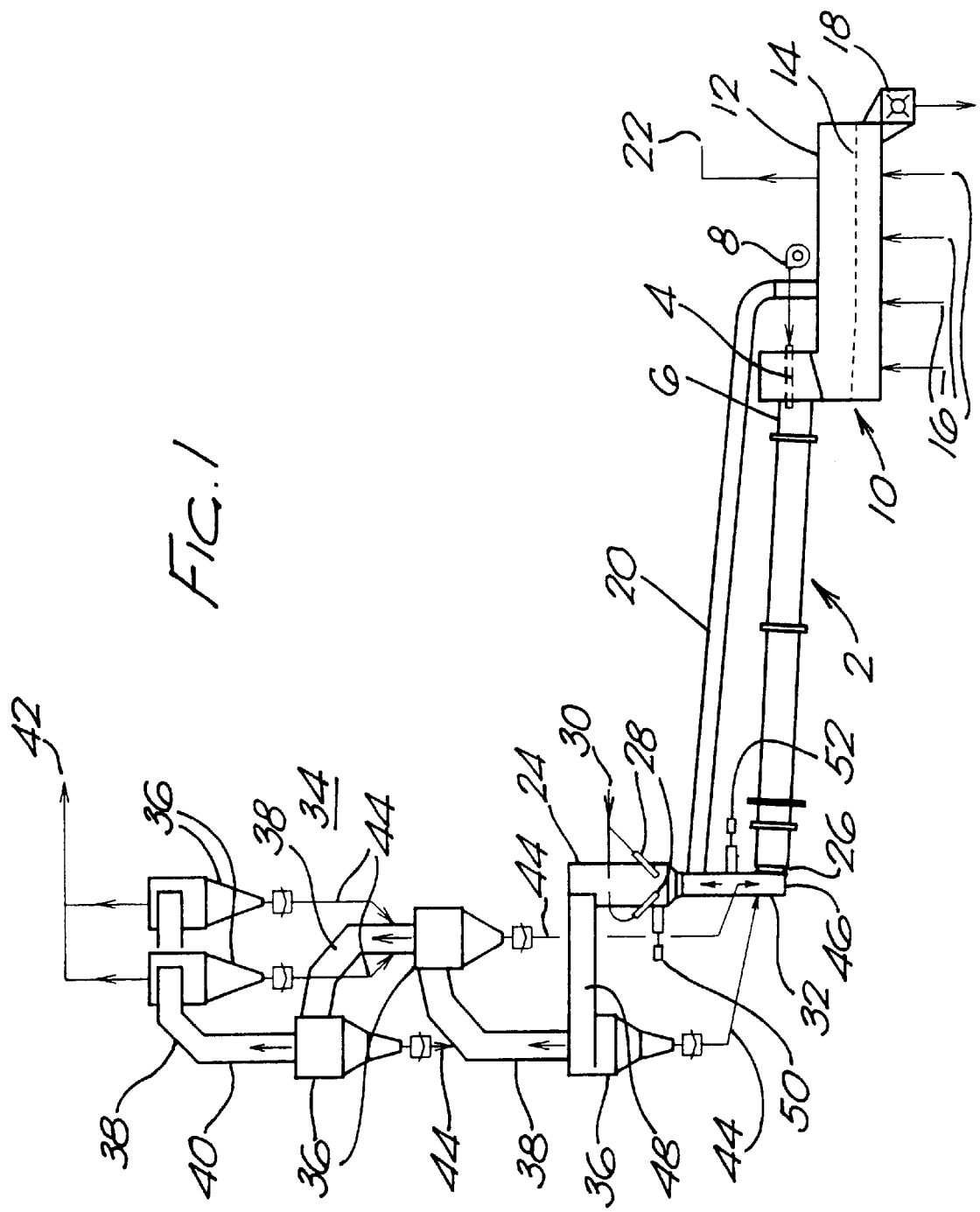
FIG. 1 is a schematic representation of a kiln system for the manufacture of Portland cement, which system comprises a combustion air-separate in-line precalciner and a riser duct that is adapted in accordance with this invention.

In the Figures, in which certain embodiments of the invention are illustrated for the purposes of exemplification, like parts are designated by the numerals. For the sake of clarity, pieces of ancillary equipment which are usual in cement making plants but which are not required for an understanding of the present invention have been omitted from the drawings.

DESCRIPTION OF EXEMPLARY EMBODIMENTS

The present invention can be applied to various mineral-processing systems, in particular mineral-burning systems, such as those in which line, magnesia or dolomite is burnt. However, it is especially useful in cement-making systems, in terms mainly of which it will be described hereinafter by way of example.

In general, the raw meal for a Portland cement-manufacturing process is formed by grinding and blending calcareous and argillaceous raw materials; a typical mixture will comprise 70–90% by weight of limestone, 10–30% by weight of clay and 0–10% by weight of materials selected to adjust the mixture to the desired composition. During the cement-manufacturing process, the raw material passes through a series of stages, including a drying stage to remove free water, typically at a temperature of up to 100° C., the removal of absorbed water, typically at 100–400° C.; the decomposition of the argillaceous minerals (e.g. kaolinite) to an intermediate stage (e.g. metakaolinite), typically at 400–750° C., and thence to free reactive oxides, typically at 600–900° C.; decomposition of carbonates to free reactive oxides, typically at 600–1,000° C.; combination of the reactive oxides to form intermediate or final clinker minerals, typically at 800–1,300° C.; formation of clinker melt from aluminates and ferrites, typically at 1,300–1,380° C.; and the formation of the alite ($C_3S$), typically at 1,250–1,500° C. These chemical reactions are endothermic, with the exception of the said combination of the reactive oxides to form intermediate or final clinker materials, which is exothermic. These reactions take place in an oxidising environment; generally, reducing conditions are absent or are limited to small specific zones for reducing the $NO_x$ content in the combustion gas. In addition to the $C_3S$, the other important clinker minerals are $C_2S$, $C_3A$ and $C_4AF$.

Although the Applicants do not wish to be bound by theory, it is believed that the volatile combustible matter in the second fuel (or solid fuel elements) is removed, separated or lost from that fuel in the first zone largely by combustion, although other reactions or mechanisms, such as pyrolysis and volatilisation, may play a part. However, for convenience, reference may simply be made to "combustion" and "combustion zone" herein.

The above-mentioned second fuel (also referred to herein as a secondary or supplementary solid fuel) will generally be non-pulverulent in form; thus, the supplementary solid fuel may be in the form of lumps, chunks, blocks, shaped articles, modules, nodules, pieces or other elements. Such elements include, for example, not only elements formed by the fragmentation or other size-reduction of larger elements but also elements formed by the consolidation of smaller elements, powders and/or granules. The supplementary fuel maybe a conventional fuel such as lump coal or coke, although various low-grade fuels may also come into consideration. In certain preferred embodiments, the supplementary solid fuel is a combustible waste material for example combustible municipal waste or the like. Tyres are a preferred source of the supplementary solid fuel. Thus, the present invention, whilst providing a means for reducing the $NO_x$ emission from a kiln plant, also provides a means whereby waste tyres may be disposed of. Accordingly, the present invention will be described hereinafter, by way of example, with references mainly to embodiments in which used tyres are employed.

The term "tyres", as applied herein to tyres to be used as a secondary fuel according to this invention, includes not only whole tyres, that is to say tyres that have not been shredded, reduced to chips or otherwise comminuted, but also tyre fragments (which term includes chunks, pieces, granules, shreds and the like), for example as obtained by coarse size reduction, for instance crushing, which fragments will generally have a size of not less than 150 mm. The expression "whole tyres" includes tyres that are damaged or worn. The tyres will usually be motor-car tyres but tyres from motorcycles, vans, lorries, buses, coaches and other motor vehicles come into consideration.

In air-separate precalciner systems, wherein the bulk of the air for combustion within the precalciner is supplied through the tertiary air duct, consideration may be given to the introduction of supplementary solid fuel in the riser duct between the back end of the kiln and the precalciner vessel, or to the arrangement for partially combusted supplementary solid fuel residues to enter that riser duct from the preheater vessel. The conditions may be controlled so as to allow the supplementary solid fuel to burn in that riser duct in a reducing atmosphere, which will assist in the lowering of the content of $NO_x$ (nitrogen oxides) that has been generated during fuel combustion in the clinkering zone of the kiln.

The air-separate (or "AS") in-line precalciner kiln system illustrated in FIG. 1 comprises a rotary kiln 2, which is equipped with a burner 4 at its front (mineral outlet) end 6, the burner 4 being supplied with an appropriate source 8 of fuel, for example, pulverized coal, natural gas or fuel oil. The burner 4 may be equipped in known manner with one or more nozzles (not shown) for the injection of primary air for combustion.

The cement clinker which emerges from the front end 6 of the kiln 2 passes into a clinker cooler 10, which in the illustrated embodiment is a grate cooler comprising essentially a chamber 12 through which the clinker passes on a grate 14, through which grate is passed cooling air from a number of inlets 16. The clinker which has thereby been cooled through heat-exchange with the cooling air, is then transported from the cooler outlet 18 for further processing, including grinding. The air that has been heated through heat-exchange with the hot clinker passes, in part, into the front end 6 of the kiln, as so-called "secondary air". A further portion of the air may be extracted from the grate cooler through a tertiary air duct 20. The residual hot air, if any, is taken off through the cooler exhaust 22.

A precalciner 24 is operatively connected to the back (mineral inlet) end 26 of the kiln. The precalciner 24 is provided with one or more burners 28 which are provided with a supply 30 of an appropriate fuel, for example pulverised coal, natural gas or fuel oil. Air for the combustion of the fuel within the precalciner 24 is obtained partly from the hot gas emerging from the mineral inlet 26 of the kiln, which inlet communicates with the precalciner 24 by means of a riser duct 32. The greater part of the air for combustion in the precalciner 24 is, however, supplied through the above-mentioned tertiary air duct 20.

The ground starting materials (the "raw meal") are not fed directly into the rotary kiln 2 but, instead, are passed into a preheater system 34 comprising a plurality of cyclones 36 and riser ducts 38, which are arranged in generally vertical series. The hot gases from the kiln and the precalciner enter the lower stage and are drawn upwards by means of a waste-gas fan (not shown) through the riser ducts 38 (which act as a series of heat-transfer vessels). The meal is introduced through an inlet 40 near the top of the system into the highest riser duct, which connects the topmost cyclones to the next highest cyclone. The gas flow carries the meal up to the top cyclones allowing heat transfer to take place. The top cyclones separate the mean and the gas streams, the gas being taken off through the preheater exhaust 42 and the meal being conveyed downwards through meal conduits 44 into the next highest riser duct where the meal is again picked up by a gas stream. This pattern is repeated down through the preheater system 34 until the meal is transferred through a meal conduit 44 from the penultimate cyclone to the riser duct 32 connecting the back end 26 of the kiln with the precalciner 24. Some of that meal will drop into the kiln hearth 46, or shelf transition portion, and thence into the kiln. however, a substantial proportion of the meal will be entrained in the hot gas rising through that riser duct 32 and so will be carried into the precalciner 24. The mixture of gas and meal leaving the precalciner 24 is conveyed through a conduit 48 to the lowermost cyclone, the gas stream from which passes into the next riser duct 38 of the preheater system 34 whereas the meal that is separated out in the lowermost cyclone is passed to the kiln hearth 46 adjacent the back end 26 of the kiln. For the purposes of this specification the precalciner 24 and the kiln riser duct 32 located between it and the back end 26 of the kiln 2 in such AS systems may be regarded as part of the preheater system 34.

In practice, very little heat exchange occurs within the cyclones, which are primarily a means for separating the meal and gas flows. The upper preheater stages tend simply to preheat the meal but within the two lowermost stages decarbonation begins to occur.

Typically, in an air-separate precalciner system such as that illustrated in FIG. 1, approximately 60% of the total fuel is combusted in the precalciner 24. Typically, the gas residence time in the precalciner vessel 24 is about 2 seconds and the mineral material is exposed therein to gas temperatures of 860–900° C., as a result of which a decarbonation level of approximately 92% is typically achieved within the precalciner vessel 24. The thermal load on the kiln tube is accordingly reduced and in such a system approximately 40% of the total fuel is used to complete the decarbonation process and to raise the mineral material to the sintering zone temperatures required to produce the final clinker.

In accordance with one aspect of the present invention, the kiln riser duct 32 connecting the kiln inlet 26 to the precalciner vessel 24 is fitted with a tyre-feeder device 50 and means (not shown in FIG. 1) for supporting the tyres fed into the riser duct 32 in contact with the hot gas therein for a sufficient time to achieve at least partial combustion of the tyres. The arrangement is primarily aimed at a completing some proportion of the tyre combustion in a region of the riser duct where there would be a surplus of the secondary fuel introduced relative to the air available for combustion. This would give rise to so-called reducing conditions in this region with the objective of eliminating a significant proportion of the $NO_x$ generated within the burning zone of the kiln.

If required for staged combustion, a further tyre feeder 52 may be fitted to the precalciner vessel 24. By "staged combustion" is meant the practice where a plurality of points are provided for the introduction of supplementary fuel in the riser and precalciner ducts. The remainder of the secondary fuel would then be introduced at a point after tertiary air is mixed with the gases coming from the kiln riser 32, and this second stage of combustion reduces the carbon monoxide and volatiles that have been generated in the initial stage of combustion.

It may be mentioned that the gas flow in the riser duct may not be uniform and the present invention offers scope for the placement of the combustion zone/supplementary fuel-supporting means in order to achieve optimum performance. Thus, it may prove advantageous to situate the tyre feeder 50 on the opposite side of the duct to that shown in FIG. 1, in particular to avoid contact of the tyres or other fuel elements with any air that might leak up the side of the duct from the kiln seal (not shown, but located at the junction of the mineral inlet end of the kiln or kiln hearth with the riser duct).

The tyres or other supplementary fuel elements that are introduced may substitute for all or part of the fuel that would otherwise be used in the precalciner; volatiles and combustible products from the said combustion zone will pass up the riser pipe or duct to the precalciner and may be combusted therein. Nonetheless, as indicated above, it may still prove advantageous to add further tyres or solid fuel elements in the precalciner itself (as indicated above with reference to feeder 52 in precalciner 24). Tertiary air, namely the air—generally obtained from the clinker-recovery cooler zone—that is passed to the precalciner vessel in order to support combustion of fuel in the precalciner, is generally required in order to effect burning of the above-mentioned volatiles and combustible components obtained from the burning of the tyres or other fuel elements under reducing conditions in the combustion zone. The tertiary air is introduced downstream (relative to the flow of gas through the combustion zone) of the combustion zone in which the tyres or the like are burnt, the tertiary air conduit supplying an air inlet in the riser duct or, possibly, in the precalciner vessel itself.

Figure 2:
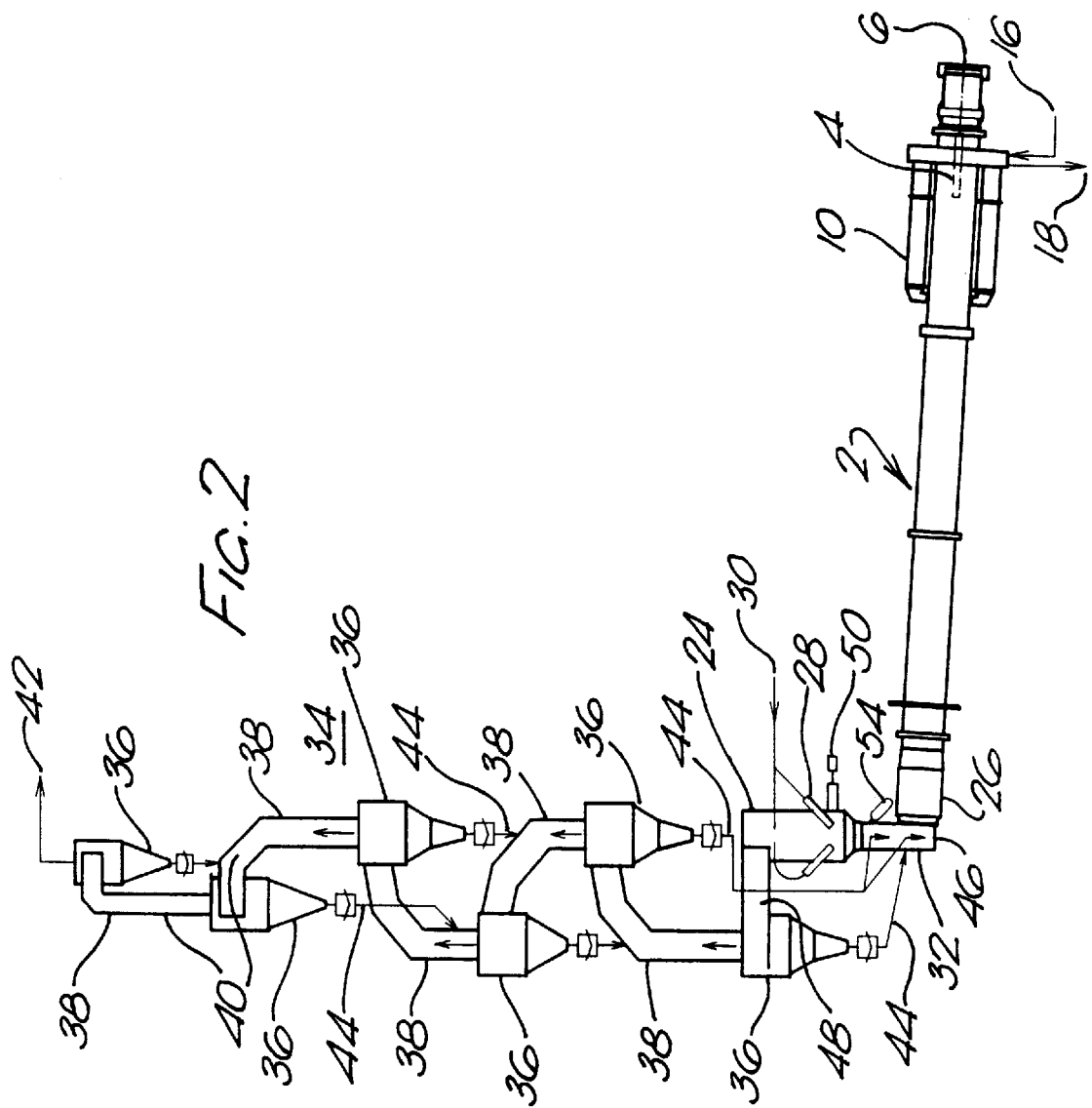
FIG. 2 is a schematic representation of a kiln system for the manufacture of Portland cement, which system comprises a combustion air-through in-line precalciner that is adapted in accordance with this invention.

The kiln system illustrated in FIG. 2 differs from the kiln system of FIG. 1 in six main respects. First, there is a different arrangement of cyclones 36 in the preheater section 34, although the same basic principles of operation apply. Second, there is no tyre-feeder associated with the riser duct between the kiln inlet and the precalciner vessel 24; however, the precalciner vessel 24 is fitted with a tyre-feeder device 50 and means (not shown in FIG. 1) for supporting the tyres fed into the precalciner vessel 24 in contact with the hot gas therein for a sufficient time to achieve at least partial combustion of the tyres. Third, the system uses a planetary cooler 10 in place of the grate cooler, and this gives rise to a fourth difference which is that substantially all of the air that has been heated by heat-exchange with the hot clinker in the cooler 10 is utilised, not as tertiary air, but as secondary air which passes through the kiln 2 to the precalciner 24. Fifth, an air blaster 54 is associated with the riser tube 32 but this is not necessary either for the tyre feeder or the operation of the present process. Sixth, the raw meal feed is introduced into the top two riser ducts 38 through respective inlets 40. In this air-through (or "AT") arrangement, the apportionment of the total fuel is typically 65% to the kiln burner 4 and 35% to the precalciner burners 28. Decarbonation rates of 40–70% are typically achieved before the meal enters the kiln 2. Again, for the purposes of this specification, the precalciner 24 and the riser duct 32 located between it and the back end 26 of the kiln 2 in such AT systems may be regarded as part of the preheater system 34.

Figure 3:
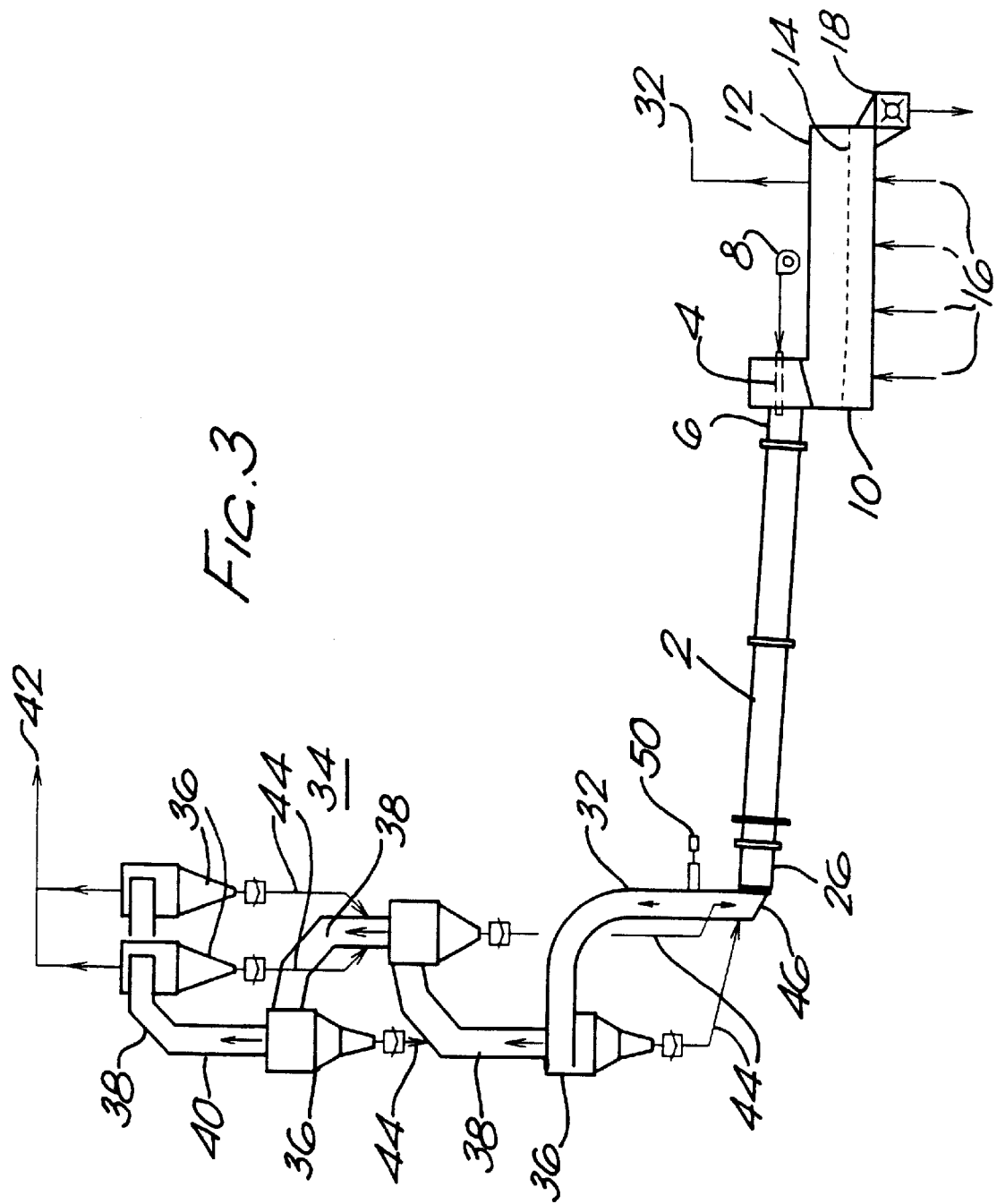
FIG. 3 is a schematic representation of a kiln system for the manufacture of Portland cement, which system comprises a suspension preheater riser duct that is adapted in accordance with this invention.

The kiln system of FIG. 3 differs primarily from the kiln system of FIG. 1 in that the precalciner 24 is dispensed with and the riser duct 32 from the kiln inlet 26 is directly connected to the lowermost cyclone 36 of the preheater section 34. Furthermore, there is no tertiary air duct: all of the air which is heated by heat-exchange with the hot clinker in the grate cooler 10 (other than the air which is vented through the cooler exhaust 22) is employed as secondary air, which passes through the kiln 2 into the kiln riser duct 32. In suspension preheater (or "SP") kiln systems of this type, a level of decarbonation of 25–50% is typically achieved before the meal enters the kiln 2. For the purpose of this specification the riser duct 32 located between the lowermost cyclone 36 and the back end 26 of the kiln in such SP Systems may be regarded as part of the preheater system 34.

The vertical section of the riser duct 32 shown in FIG. 3 is equipped with a tyre feeder 50 and associated means (not shown in FIG. 3) for supporting the tyres within the kiln riser duct 32 in contact with the hot gas in that duct for a time sufficient to achieve at least partial combustion of the tyres.

It will be understood that the present invention can be put into practice with precalciner or preheater kiln systems with arrangements different from those illustrated in FIGS. 1–3. For example, the air-through system could comprise a grate cooler in place of the planetary cooler whereas the preheater system could comprise a planetary cooler instead of the grate cooler; indeed, in principle, another type of clinker cooler may be used, for example a rotary underlying cooler of the type marketed by F. L. Smidth under the trade name "Duax". Furthermore, hot gas exhausted from the kiln hood may be passed back into the system so that its heat content and oxygen content may be utilised. Moreover, again by way of example, the number and arrangement of cyclones and riser ducts in the preheater section may be varied according to the demands placed upon the cement-manufacturing plant. Also, the number of tyre-feeders may be increased to two or more, in order to increase the rate of disposal, subject of course to the dimensions of the precalciner and/or riser duct and the cement/production capacity of the system.

Figure 4:
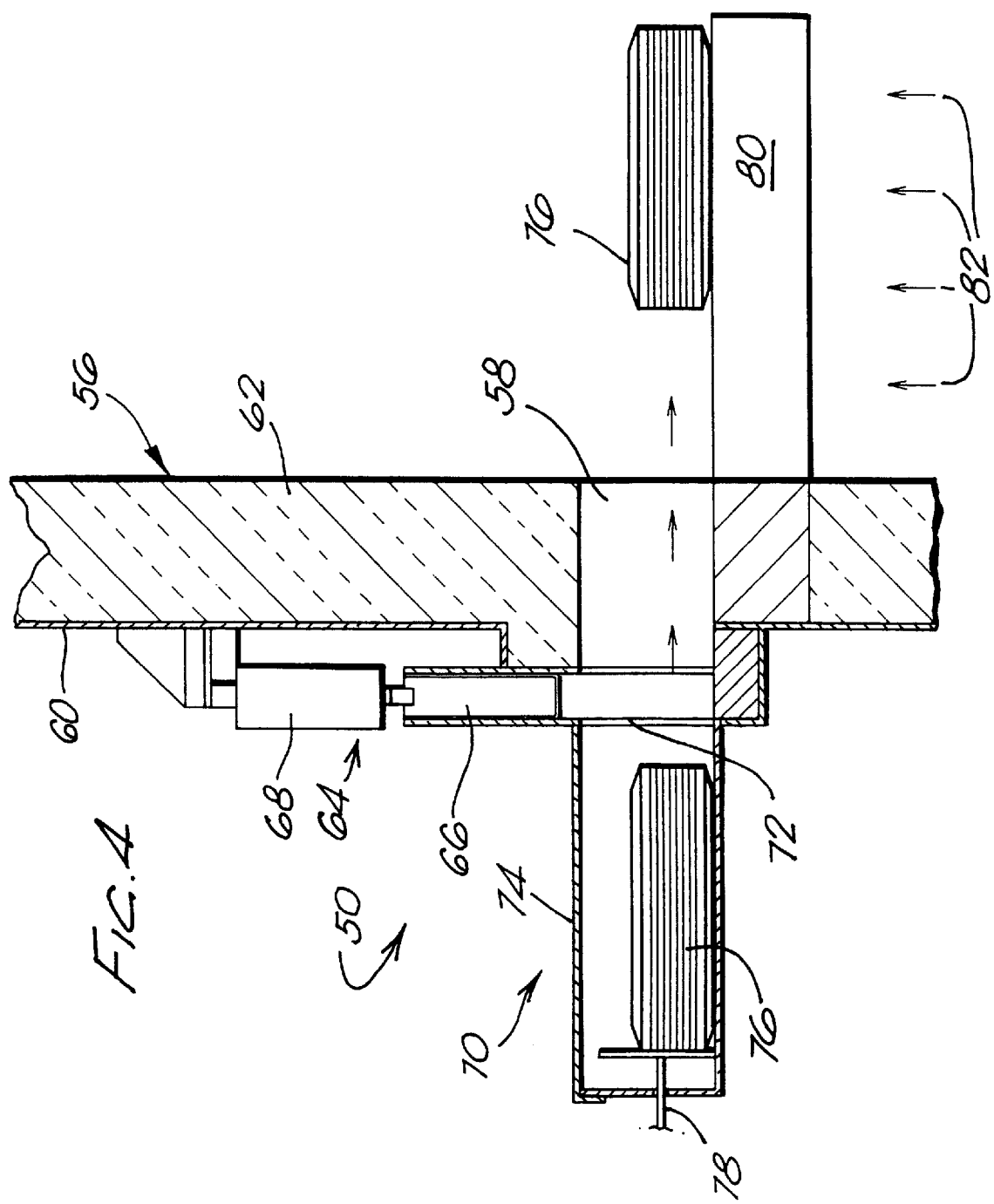
FIG. 4 is a schematic representation of apparatus for feeding a secondary fuel into a precalciner or a preheater riser duct in accordance with the present invention.

Turning now to FIG. 4, there is illustrated a tyre feeding system 50 that may be incorporated into the wall 56 of a precalciner or preheater riser duct in accordance with this invention. (The tyre feeding system 52 may be of similar construction.) The feeding system comprises an inlet or entry port 58 in the wall 56 of the precalciner or riser duct, which wall comprises an outer casing 60 and an inner lining 62 of refractory material. The inlet is provided with closure means 64 which comprises a shut-off gate 66 which is selectively movable by means of a pneumatic cylinder 68 between a first position where the gate seals the inlet port 58 completely, and a second position where the said gate is retracted away from the inlet port. Aligned with the inlet port is a seal box 70 which has an opening 72 at the side thereof that is adjacent the inlet port. The opening 72 in the seal box 70 is also selectively closed or opened by the shut-off gate 66 when the later is in its first or second position, respectively.

The operation of the feeding system is as follows. First, the shut-off gate 66 is moved to the first position so as to seal both the inlet port 58 and the said opening 72 in the seal box 70. The seal box 70 is provided with a cover 74 which is lifted or retracted so as to permit the placement of a tyre 76 into the seal box 70, after which the cover 74 is returned to its position. The shut-off gate 66 is then retracted to its second position and a ram feeder 78, which has hitherto been retracted is extended so as to push the tyre 76 through the opening 72 in the seal box and through the inlet port 58 onto a tyre support 80 located within the precalciner (e.g. 24, as in FIG. 1 or 2) or the riser duct (e.g. 32, as in FIG. 1 or 3) and which is rigidly attached to the wall 56 thereof. The tyre is thereby located in the flow 82 of gas within the precalciner or riser duct. The ram feeder 78 is then retracted and the shut-off gate 66 is returned to the first position to seal the inlet port 58. It will be sent that the operation of the shut-off gate 66 and the seal box 70 is such as to minimise the ingress of cool ambient air into the precalciner or riser duct during the tyre-feeding operation and to minimise the emission of hot gas from the precalciner or riser duct. If desired, means (not shown) may be provided to enable the shut-off gate to be bolted shut when the tyre-disposal system is not in operation so as to prevent air leaking into or gas leaking out of the precalciner or riser duct. In prototype or small-scale operations, the pneumatic cylinder for the shut-off gate may be manually actuated, and the ram feeder may be manually operated. However, for normal commercial operations, the ram feeder will be hydraulically or mechanically operated and its operation, as well as the operation of the shut-off gate and the means for conveying the tyres to the seal box will be under automated control.

Since the combustion of tyres is intensely hot, the feeder system preferably locates the tyre on the support 80 at a sufficient distance from the wall so as to avoid undue damage to the refractory lining. Of course, the tyre support may be long enough in certain embodiments to accommodate two or more tyres within the combustion zone, since a precalciner duct commonly is several metres in diameter. The tyres may then be at varying degrees of combustion, e.g. from incipient combustion through to being burnt out.

The tyre-feeding system illustrated in FIG. 4 can be readily adapted for the handling of solid wastes other than used tyres. Furthermore, the feeder system may be modified so as to provide an intermediate staging region for the solid waste before it is conveyed onto the support 80. The intermediate staging region may be provided with insulation. The feeding system may also be modified by the provision of means for applying a combustion control agent to the combustible waste material prior to the conveying of the waste material on to the support 80; conveniently, the means for supplying the combustion agent may include a feed line which communicates with the aforesaid intermediate staging region. Yet another possible modification is the provision of means for directing a gas, e.g. an oxygen-containing gas, such as air, from a source outside the kiln gas stream such that the said gas contacts the fuel on the support. These and other possible modifications are described in U.S. Pat. No. 5,816,795, the teaching in which is incorporated herein by reference.

Figure 5:
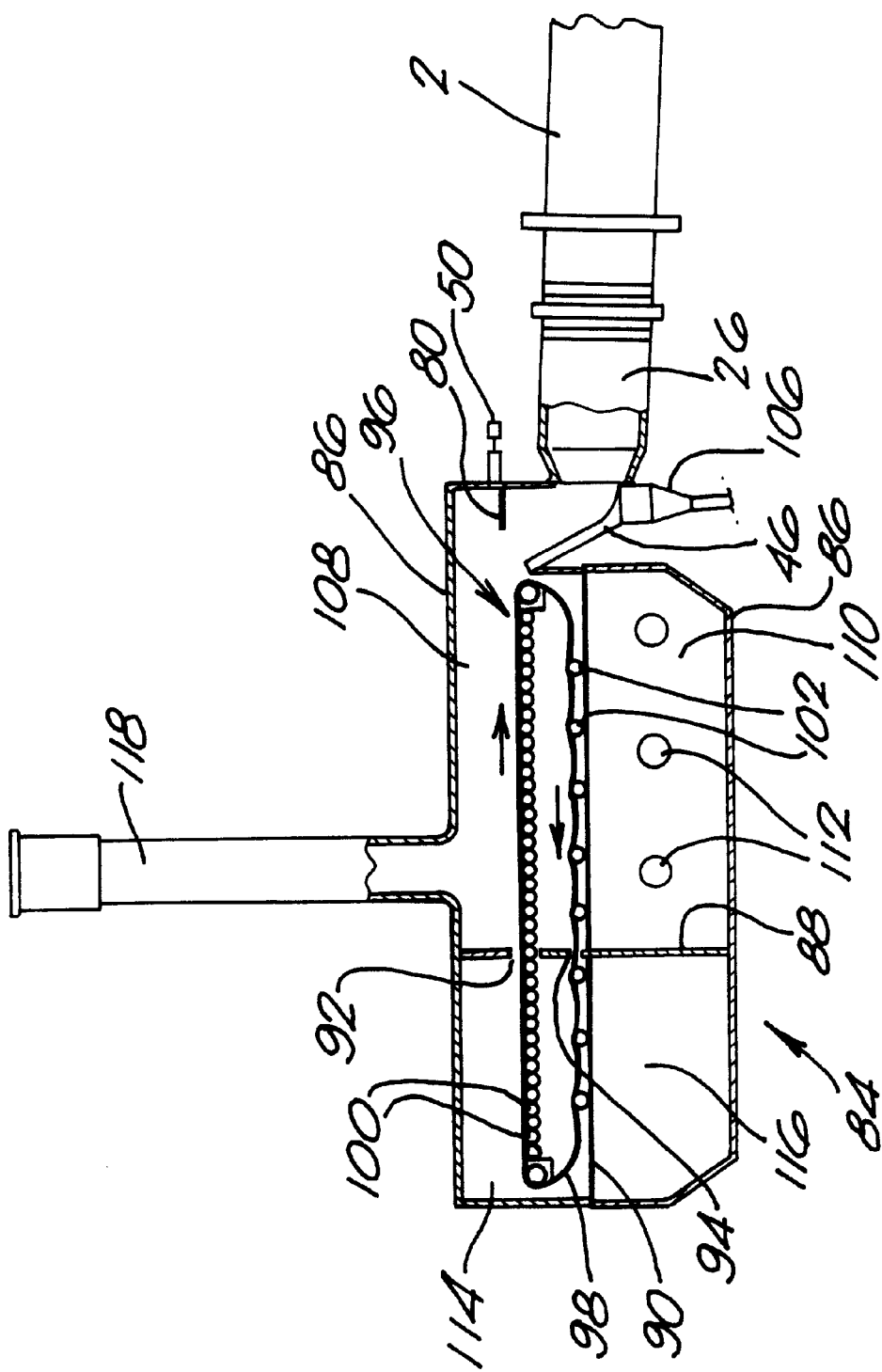
FIG. 5 is a schematic representation of part of a kiln system which comprises a Lepol grate preheater that is adapted in accordance with the present invention.

FIG. 5 illustrates a kiln system comprising a Lepol grate preheater defined generally by an outer wall 86, the interior space of which is subdivided into four chambers by a generally vertical partition wall 88 and a generally horizontal, raised floor 90. The upper part of the partition wall 88 (the part above the floor 90) has an upper aperture 92 and a low aperture 94 therein.

Mounted on the raised floor 90 is a travelling grate system 96 comprising a grate 98 in the general form of an endless belt, the upper flight of which is supported on rollers 100 and the lower, or return, flight of which is supported on lower rollers 102. Inlet means (not shown) are also provided for the feeding of nodulised raw material from a feeder hopper (not shown) onto the upper flight of the travelling grate 98, at or near the left-hand end thereof (as shown in the figure). The travelling grate, in operation, is moved by driving means (not shown) such that the upper flight moves from left to right (as shown in the figure), the said upper flight and the bed of raw material thereon passing through the upper aperture 92 in the partition wall 88. The lower or return, flight of the travelling grate 98 passes through the lower aperture 94 in the partition wall 88.

The raw material is discharged from the upper flight of the travelling grate 98 at the right-hand end thereof (as shown in FIG. 5) onto the kiln hearth 46 and thence into the back end 26 of the kiln 2. A receptacle 106 may be provided for the collection of any spillage of solids from the back end 26 of the kiln 2.

In operation, the gas emerging from the back end 26 of the kiln flows into a first chamber 108, commonly known as the "above calciner chamber", and is then drawn down by the so-called intermediate fan (not shown) through the bed of material on that part of the upper flight of the travelling grate 98 that is within the above calciner chamber 108. The gas then passes into a second chamber 110, commonly known as the "below calciner section", the floor 90 being so constructed as to allow the passage of gas from the first chamber 108 to the second chamber 110. The gas is then drawn out of the below calciner section 110 through outlets 112 and then through the intermediate cyclones (not shown) and fan (not shown), and then into a third chamber 114, commonly referred to as the "above drier section", via an inlet (not shown). The gas is drawn—by the main, induced-draught fan (not shown)—through the raw material on that part of the upper flight of the travelling grate 98 that is within the above drier section 114. The gas then passes into the fourth chamber 116, also known as the "below-drier section" (the floor 90 being so constructed as to allow the passage of gas), from which section 116 the gas is exhausted through means (not shown) to a gas-cleaning device (not shown). Thus, the hot gases from the kiln are utilised in the Lepol grate system for the preheating and/or precalcination of the raw material in the above calciner chamber 108, and also for the drying of the raw material that has been fed onto the travelling grate 98 within the above drier section. If appropriate, an auxiliary stack 118 may be provided for the purposes of warming up the grate (the auxiliary stack thereafter playing no part in the gas flow through the system during operation).

A tyre-feeding device 50 is provided for the purpose of feeding waste tyres onto a support 80 attached to the interior of the wall 86 and extending into the above calciner chamber 108 above the kiln hearth 46. The operation of the tyre feeding device 50 may be as described above in connection with FIG. 4. As for the apparatus illustrated in FIG. 4, the tyre-feeding device may be adapted for the use of supplementary solid fuel other than waste types; furthermore, the tyre-feeding device may also be modified, again as indicated above, in accordance with the proposals in U.S. Pat. No. 5,816,795.

A tertiary air duct 120 is provided in order to introduce air from the clinker cooler into the interior of the Lepol grate preheater at a point downstream of the tyre support 80 (in the direction of the flow of gas from the kiln 2 through the preheater).

In the Lepol grate device shown in FIG. 5, the floor 90 can preferably be omitted and the travelling grate system 96 may be supported on transverse rods or beams in conventional manner. The chambers 108, 110, 114 and 116 would then be formed by the partition wall 88 and the travelling gate 98 itself (preferably the upper flight thereof).

The tyre support within the precalciner or riser duct or the Lepol grate system may be a simple shelf or platform having appropriate dimensions to support the tyre or other supplementary solid fuel whilst it undergoes combustion in contact with the hot gas within the precalciner or riser duct. However, in order to increase the surface area of the tyre or other supplementary solid fuel that is in contact with the hot gas, and thereby to increase the rate of combustion of the tyre or other supplementary solid fuel, it is preferred that the support be provided with one or more apertures or gaps through which the hot gas may come into contact with at least a portion of the lowermost surfaces of the supported tyre or other supplementary solid fuel. Thus, for example, the tyre support may be an apertured plate or may be composed of plurality of elements that are spaced apart so as to provide the said gap or gaps. In principle, it would be possible to form the fuel support as, for instance, a grid network of criss-crossing elements; however, a currently preferred form of fuel support is constituted by a plurality of spaced-apart elongate elements, such as tubes, rods or "fingers", extending into the precalciner or riser duct space from the wall thereof. Preferably, the elongate elements forming the support are substantially co-planar and are conventionally arranged in a parallel orientation.

The type support is normally, of course, constantly exposed to a hot environment. Although consideration may be given to the use of consumable supports, for example rod-like elements that may be advanced through the riser duct or preheater wall at a rate to compensate for the consumption of the elements within the riser duct or preheater, it is preferred for ease of construction to use fixed elements. However, the fixed elements should be sufficiently durable to avoid the need for frequent replacement and the uneconomic shut-downs this would entail. A currently preferred material is high-alumina refractory material reinforced with stainless steel. Tyre supports having conduits therein for a coolant fluid also may come into consideration.

In embodiments wherein a supplementary fuel other than tyres is used the expressions "tyre support" and "tyre-feeding" device used herein should be constructed accordingly.

It will be understood that as the combustion proceeds the mass of the supported tyre or other supplementary solid fuel will be lessened. Accordingly, and especially in systems where the gas flow through the relevant section of the precalciner or riser duct is of high velocity, consideration may also be given to providing elements to both sides of, and/or above, the supported fuel to act as restraints against possible premature dislodgement of the tyre or other supplementary solid fuel by the gas flow. This may be particularly advantageous in systems where the duct lacks an expanded region, since gas velocities may then reach 20–25 $m.s^{-1}$ or even go up to 30 $m.s.^{-1}$. In systems with expanded ducts the velocities may be lower, e.g. about 6 $m.s.^{-1}$, and premature dislodgement of the tyres or other supplementary solid fuel may cease to occur. The restraining elements may be of any suitable construction, for example one or more apertured plates, one or more grids or one or more elongate elements, such as a plurality of spaced-apart elongate elements, such as tubes, rods or "fingers" extending into the space above the tyres or other secondary fuel elements.

After the rubber component of the tyres has been completely consumed, the reinforcement of the tyres, commonly zinc-coated steel wires, may remain. This residue will be dislodged from the tyre support, either by the gas flow or by the next incoming tyre support, and will generally burn off in the gas stream or fall into the kiln where it will undergo complete combustion and incorporation into the clinker. The composition of the raw meal may, of course, be adjusted so as to make allowance for the content of metal introduced with the tyres. In fact, it has been found that the tyres need not always combust completely on the support. For example, it has been found that usually the consumption of 50%, and sometimes the consumption of as little as 30%, by weight of the rubber mass of the tyre leaves a residue that can be tolerated within the rotary k in, where the residue will combust completely without causing instability and without having a deleterious effect on the cement product, although it is preferred that 70% or more, especially 90% or more, by weight of the rubber mass be consumed whilst the tyre is maintained in contact with the hot gas in the preheater section. If it can be tolerated, dislodging the tyres into the kiln before they are completely consumed could be a way of increasing the disposal rate. It will be understood that analogous considerations may apply in the case of a supplementary solid fuel other than waste tyres, for example municipal or other waste or conventional low-grade fuels.

In accordance with certain preferred embodiments of the present invention, the supplementary solid fuel is exposed to a hot gas stream which comprises exhaust gas from a rotary kiln, such that the volatile component of the supplementary solid fuel is combusted at least initially in a zone that provides at least localised regions of sub-stoichiometric atmosphere, i.e. an atmosphere that contains less oxygen than would be required for the full oxidation of the volatile components. Under such conditions, a hydrocarbon flame radical reaction takes place that reduces the oxides of nitrogen in the exhaust gas stream emerging from the rotary kiln, a process commonly termed "reburning". Furthermore, the sub-stoichiometric or "staged" combustion of the volatile fraction of the fuel produces less $NO_x$ than would be the case for a less controlled combustion process.

As a guide, the temperature of the gas stream in the zone where the supplementary solid fuel undergoes at least partial combustion will commonly be at least 800° C., typically at least 950° C., for example at least 1000° C., and will commonly be up to 1300° C., typically up to 1250° C., for example up to 1200° C.

The gas that is brought into contact with the supplementary solid fuel will normally contain from 0% to 6% by volume of molecular oxygen ($O_2$), and commonly at least 0.2% by volume. The content of molecular oxygen (if any) in the said gas stream will be preferably not more than 5% by volume, more preferably not more than 4%, and most preferably up to 3%.

The residence time during which a tyre or other supplementary solid fuel is maintained in the hot gas stream for combustion will depend on a number of factors, for example the temperature and oxygen content of the gas. As a guide, the residence time will normally be from 5 seconds to 5 minutes, for example from 10 seconds to 1 to 2 minutes.

The supplementary solid fuel is retained in position in the hot gas stream, preferably until at least 50%, more preferably at least 70% and most preferably as least 90% of the volatile material in the solid fuel has been utilised. In particularly preferred embodiments, the volatile component in the supplementary solid fuel is substantially completely consumed.

Additional combustion air or other gas that contains molecular oxygen is introduced above the position at which the supplementary solid fuel is burned, preferably using a tertiary air duct conveying hot exhaust air from a clinker cooler or other item of equipment. Furthermore, combustion air or other gas that contains molecular oxygen, for example a fraction of the exhaust gas from the clinker cooler or the like may additionally be introduced at or below the point at which the supplementary solid fuel is introduced into the hot gas stream and combusted, provided in general that the overall stoichiometric ratio is kept below 1.05, preferably below 0.95 and more preferably below 0.90, so as to ensure at least localised sub-stoichiometric combustion of the volatile portion of the fuel. Overall, for the entire amount of fuel that is used, the amount of air and/or other oxygen-containing gas supplied to the process will be at least sufficient for burn-out of all the fuel. The temperature of the gases leaving the zone in which the supplementary solid fuel is burned, for example the precalciner (if such is used), will typically be within the range of from 850 to 950° C. in order to minimise the generation of $NO_x$ from the fuel in that zone.

In certain embodiments, the invention further comprises a means for controlling the feed rate of the tyres (or other supplementary solid fuel) and/or the local oxygen level in order to produce the appropriate conditions to ensure staged combustion and thereby control, to a low level, the $NO_x$ generated by the "fuel $NO_x$" mechanism. This may be achieved by feed-back of the oxygen level measured at one or more convenient points within the process, such as the kiln back end, the precalciner furnace outlet, the preheater outlet or elsewhere, optionally accompanied by a signal indicating the CO and/or $NO_x$ levels at one or more points. It may be mentioned that certain former theories and practices have been used based on the erroneous assumption that CO is a key reagent in the reduction of $NO_x$, whereas it is in fact an indicator as to whether conditions exist that favour devolatilisation of nitrogenous radicals that can react to reduce $NO_x$, under suitable conditions. The feed-back signal or signals will be used to control the fan-induced draught or suction imposed upon the system (and hence the availability of combustion air), the delivery of supplementary (tertiary) air to complete the combustion process, and the feed rate of the tyres or other supplementary solid fuel. An indicator of temperature at one or more points may be used to ensure that conditions are sufficiently hot for combustion and yet not so extreme as to cause over-heating of the process plant. The CO content of the gases in the combustion zone may, for example, be in the range of from 0.1% to 0.9%, overall, with local variations depending upon the mixing of the gases. The level of CO in the gases leaving the zone will in general be greater than 0.01% but normally no higher than 1% so as to avoid the risk of explosion. The gas residence time in the combustion zone should normally be at least 0.5 second, preferably more than 1 second. Control mechanisms that involve the measurement of $CO_2$ contents and control mechanisms that monitor the temperature at selected locations may also come into consideration.

As already indicated, the present invention may be applied to grate preheater kilns. It may also be applied to cyclone preheater kilns that are not already equipped with a precalciner furnace, other secondary firing systems, tertiary air duct or means of control of the supply of supplementary combustion air. However, in some of these cases, the reduction in the emission of $NO_x$ may be less than can be achieved in apparatus of the kind described hereinabove.

In the application of the present invention to systems comprising a Lepol grate preheater or other preheater, it may be advantageous to introduce air, preferably 5–10% air, above the tyres or other solid fuel elements, for example through two or more injectors thereby creating a swirling or mixing action. The tyre volatile fraction can then be treated under sub-stoichiometric conditions whilst still getting a good reduction in $NO_x$ from hydrocarbons, even against an existing riser pipe firing installation. There might be a penalty of an increase in fuel consumption but this should be small (at most 20 kcal/kg).

The present invention offers a significant advantage over the known technology in which precalciner furnaces or secondary firing systems in the kiln riser duct or over-grate firing on Lepol kilns are operated with conventional fuels, even the known systems that have staged entry for tertiary air or other means to promote a measure of sub-stoichiometric combustion. The conventional pulverised solid fuels, gaseous fuels and atomised fuels are not retained for significant periods in any given temperature/oxygen content regime; accordingly, the effectiveness of the staged air introduction or fuel introduction in abating $NO_x$ is therefore at best limited and may even be negligible and, moreover, may vary for different supplies on solid fuel with different devolatilisation characteristics and different contents or compositions of the volatile components. Different suppliers of kiln equipment using various embodiments of the prior-art proposals are known to provide very different guarantees of $NO_x$ emission levels when offering to supply.

In contrast, the present invention, by employing solid fuel elements supported in a fixed position for much of their combustion, coupled with the control of staged arrival of oxygen-bearing combustion gas, provides an effective control of $NO_x$ emissions. The present invention also avoids undue transport of unburned fuel into the rotary kiln, where its delayed combustion could adversely affect the volatilisation and decomposition and subsequent deposition of sulphur compounds, which would lead to accretions and blockages in the system.

Furthermore, it has been found that tyres are a better fuel than coal in terms of effectiveness of $NO_x$ reduction because they have typically about 65% content of volatiles compared with about 30% for an average-grade coal, the tyres offering therefore a greater reduction per unit mass, or per unit calorific value, of fuel burnt under suitable conditions. Reburning using pulverised coal that is simply dispersed into the gas stream offers no advantages. With the present invention, however, the location of the burning tyres or other fuel elements can be in a part of the preheater system wherein the maximum gas flow has been identified (by in situ measurements or by computational fluid dynamic modelling of the flow and combustion) and hence in the region with the greatest reburning potential for the volatile fraction of the tyres.

EXAMPLE

The precalciner of an air-separate precalciner kiln system for the manufacture of ordinary Portland cement was equipped with a tyre support comprising three parallel refractory fingers extending from the refractory-lined interior wall of the precalciner. The refractory fingers were so dimensioned and arranged as to provide support for an automobile tyre lying on its side. Specifically, the fingers were constructed of stainless steel (20 Cr, 20 Ni) tubes coated with Durax high-alumina concrete. The fingers, which each had an outside diameter of 50–70 mm, extended 1.5 m into the kiln. The tyres were supported at a distance of 0.5 m from the precalciner wall.

Approximately 120 automobile tyres were fed manually through a double-flap system onto the refractory fingers at a rate of addition of 1 tyre every 30 seconds, which correspond to a rate of about 1 tonne per hour. The burners in the plant were coal-fired and the amount of coal consumed was reduced by an amount commensurate with the calorific value of the tyres that were introduced.

The precalciner did not have an expanded duct and the gas velocity through it was comparatively high, at 13 m.s$^{-1}$. A drop of 2% in the kiln back-end oxygen, the occurrence of some CO spikes and an increase in kiln back-end temperature of 70–80° C. were detected, from which it is was deduced that the tyres were being swep off the finger frame before complete combustion and the residues were falling into the back of the kiln. However, the kiln remained stable and there was no reduction in the kiln production rate. Furthermore, the second stage and preheater exit conditions remained steady and no instability was detected in the preheater $O_2$ and CO levels.

It will of course be understood that the present invention has been described above purely by way of example and that modifications of detail can be made within the scope of the invention. For example, there may be differences in detail of geometry amongst various specific kiln systems that depart from the precise arrangements mentioned above and illustrated in the accompanying drawings.

What is claimed is:

1. A method of reducing the emission of nitrogen oxides from a mineral-burning process, which process comprises the steps of feeding mineral raw material into a rotary kiln where it is burnt, the rotary kiln being fired by the combustion therein of a first fuel in the presence of a first combustion-supporting gas, the method being characterised by the steps of passing the exhaust gas from the rotary kiln through a combustion zone and of introducing a second fuel, in the form of solid fuel elements, into the said combustion zone, the solid fuel elements being maintained with the said zone until at least 30% by weight of the volatile combustible content thereof has been removed from said fuel elements, the said combustion zone containing at least one region in which combustion of at least part of the volatile combustible component(s) of the second fuel occurs under sub-stoichiometric conditions.

2. A method according to claim 1 in which the rotary kiln is associated with a preheater section into which the exhaust gas from the rotary kiln is passed, wherein the said second fuel is introduced into a gas stream within the preheater section.

3. A method according to claim 2, wherein the preheater section comprises at least one cyclone and at least one heat-exchange duct, and the said second fuel is introduced into the gas stream at at least one point between the mineral inlet end of the rotary kiln and the lowermost preheater cyclone.

4. A method according to claim 3, wherein the preheater section comprises a precalciner vessel and a riser duct between the material inlet end of the kiln and the lowermost preheater cyclone, and wherein the said second fuel is introduced into one of the precalciner vessel and the said riser duct.

5. A method according to claim 4 wherein the said fuel is introduced into the riser duct, further fuel is combusted in the precalciner vessel, and the mineral material that is burned in the rotary kiln is subsequently cooled in a cooling device by means of air, at least part of the air that is exhausted from the cooling device being conveyed to support the said combustion in precalciner vessel.

6. A method according to claim 3 wherein the preheater section comprises a precalciner vessel between the mineral-inlet end of the kiln and the lowermost preheater cyclone, and wherein the said second fuel is introduced into the said precalciner vessel.

7. A method according to claim 3, wherein the preheater section comprises a riser duct between the mineral-inlet end of the kiln and the lowermost cyclone, and wherein the said second fuel is introduced into the said riser duct.

8. A method according to claim 2, wherein the preheater section comprises a Lepol grate preheater into which the said fuel is introduced.

9. A method according to claim 1, wherein the mineral-burning process is a cement-manufacturing process.

10. A method according to claim 1, wherein the combustion zone into which the said second fuel is introduced has a temperature of from 800° C. to 1300° C.

11. A method according to claim 10, wherein the combustion zone has a temperature of from 950° C. to 1250° C.

12. A method according to claim 1, wherein the gas in the combustion zone has a content of molecular oxygen of from 0 to 6% by volume.

13. A method according to claim 12, wherein the gas in the combustion zone has a content of molecular oxygen of from 0 to 3% by volume.

14. A process according to claim 1, wherein the overall stoichiometric ratio in the combustion zone is less than 1.05, provided that at least one localised region has a sub-stoichiometric ratio.

15. A method according to claim 14, wherein the overall stoichiometric ratio in the combustion zone is less than 0.90.

16. A method according to claim 1, in which the said solid fuel elements are maintained in the combustion zone such that at least 50% of the volatile combustible material therein has been removed from said fuel elements.

17. A method according to claim 16, in which the said solid fuel elements are maintained in the combustion zone such that at least 70% of the volatile combustible material therein has been removed from said fuel elements.

18. A method according to claim 17, in which the said solid fuel elements are maintained in the combustion zone such that at least 90% of the volatile combustible material therein has been removed from said fuel elements.

19. A method according to claim 1, in which the rotary kiln is associated with apparatus that comprises a support for supporting at least one solid fuel element within the combustion zone and a feeder for feeding solid fuel elements to the supporting means.

20. A method according to claim 19, in which the rotary kiln is associated with a preheated section that comprises at least one cyclone and at least one heat-exchange duct; a gas-conveyor that is adapted to convey hot gas from the mineral-inlet end of the rotary kiln to the lowermost cyclone, the said gas-conveyor being provided with at least one inlet through which solid fuel elements may be fed; a door for selectively opening and closing the inlet; a support for supporting at least one solid fuel element within the gas-conveyor such that the solid fuel element so supported will be in contact with hot gas within the gas-conveyor during operation; and a feeder for feeding solid fuel elements through the inlet, when open, and onto the said support.

21. A method according to claim 20, in which the gas-conveyor comprises a precalciner vessel and/or a riser duct, and a support is provided to support at least one solid fuel element within the said precalciner vessel and/or a support is provided to support at least one solid fuel element within the said riser duct.

22. A method according to claim 19 in which the combustion zone is within a Lepol grate preheater having a support for supporting at least one solid fuel element therein.

23. A method according to claim 19 in which the support has one or more apertures or gaps through which hot gas may come into contact with at least a portion of the lowermost surfaces of a supported solid fuel element.

24. A method according to claim 23 in which the support comprises a plurality of elongate elements spaced one from another.

25. A method according to claim 19 in which restraining elements are provided to avoid premature dislodgement of the solid fuel element from the support.

26. A method according to claim 19 in which tires are used as the said second fuel.

27. A method according to claim 1 in which tyres are used as the said second fuel.

28. A method according to claim 27 in which a second combustion-supporting gas, being a gas that contains molecular oxygen, is introduced downstream (relative to the flow of said kiln exhaust gas through the said combustion zone) of the position at which the second fuel is combusted.

29. A method according to claim 28 in which combustible product from the said combustion zone are combusted downstream of the combustion zone.

30. A method according to claim 29 in which combustion of the said combustible product is effected in a precalciner vessel.

31. A method according to claim 30 in which further fuel is combusted in the precalciner vessel.

32. A method according to claim 31 in which the said further fuel comprises tires.

33. A method according to claim 1 in which a second combustion-supporting gas, being a gas that contains molecular oxygen, is introduced downstream (relative to the flow of said kiln exhaust gas through the said contribution zone) of the position at which the second fuel is combusted.

34. A method according to claim 33 in which the said second combustion-supporting gas is or comprises air.

35. A method according to claim 34 in which said air is or comprises air from apparatus in which the mineral matter from the kiln is cooled.

36. A method according to claim 35 in which the said combustion zone is within a riser duct and the said combustion-supporting gas is introduced into the riser duct at a position downstream of the combustion zone.

37. A method according to claim 33 in which the said combustion zone is within a riser duct and the said second combustion-supporting gas is introduced into the riser duct at a position downstream of the combustion zone.

38. An method according to claim 33, in which combustible product from the said combustion zone are combusted downstream of the combustion zone.

39. A method according to claim 38 in which combustion of the said combustible products is effected in a precalciner vessel.

40. A method according to claim 39 in which further fuel is combusted in the precalciner vessel.

41. A method according to claim 40 in which the said further fuel comprises tires.

42. An apparatus for the carrying out of a mineral-burning process, which apparatus comprises a rotary kiln in which mineral raw material may be burnt, said kiln having a mineral-inlet end and a mineral-outlet end; a preheater section which comprises at least one cyclone; a gas-conveyor for conveying a flow of kiln exhaust gas the mineral-inlet end of the kiln to the lowermost preheater cyclone; a support for supporting at least one solid fuel element within the gas-conveyor such that the said fuel element so supported will be in contact with the hot exhaust gas within the gas-conveyor during operation; a feeder arranged such that it can feed solid fuel elements to the side support; and a gas inlet for introducing a combustion-supporting gas into the gas-conveyor at a point downstream, relative to flow of the kiln exhaust gas, of the said support.

43. An apparatus according to claim 42, in which the said gas-conveyor is provided with a least one inlet through which solid fuel elements may be fed; and means for selectively opening and closing the inlet; the feeder being arranged to feed solid fuel elements through the inlet, when the latter is open, onto the said support.

44. An apparatus according to claim 42 in which the gas-conveyor comprises a riser duct and a support is provided to support at least one solid fuel element within the said riser duct.

45. An apparatus according to claim 42, in which the gas-conveyor comprises a precalciner vessel and a support is provided for support at least one solid fuel element within the said precalciner vessel.

46. An apparatus according to claim 42, in which the preheater section comprises a Lepol gate preheater that comprise a travelling grate and in addition that is provided with a support for supporting at least one solid fuel element with the Lepol grate preheater.

47. An apparatus according to claim 42 in which the support has one or more apertures or gaps through which hot gas may come into contact with at least a portion of the lowermost surfaces of a supported fuel element.

48. An apparatus according to claim 42 in which the support comprises a plurality of elongate elements that are spaced one from another.

49. An apparatus according to claim 42 which comprises restraining elements arranged to avoid premature dislodgement of a solid fuel element from the support.

50. An apparatus according to claim 42, which comprises a cooler for cooling burnt mineral that has emerged from the mineral outlet end of the kiln; air inlets for supplying cooling air to the cooler; and a gas conduit arranged to convey air passing out of the cooler to the said gas inlet in the gas-conveyor.

* * * * *